(12) United States Patent
Ishii

(10) Patent No.: US 6,542,935 B1
(45) Date of Patent: Apr. 1, 2003

(54) METHOD FOR OBTAINING A SECOND ADDRESS FREE FROM ASSOCIATION WITH MULTIPLE DEVICES

(75) Inventor: Art Ishii, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/363,069

(22) Filed: Jul. 28, 1999

(51) Int. Cl.[7] .............................................. G06F 15/16
(52) U.S. Cl. ........................ 709/245; 709/227; 709/248
(58) Field of Search ................................. 709/227, 245, 709/248

(56) References Cited

U.S. PATENT DOCUMENTS

| | | | |
|---|---|---|---|
| 5,150,464 A | 9/1992 | Sidhu et al. ................. | 395/200 |
| 5,159,592 A | 10/1992 | Perkins ....................... | 370/85.7 |
| 5,166,931 A | 11/1992 | Riddle ........................ | 370/94.1 |
| 5,708,655 A | 1/1998 | Toth et al. ................... | 370/313 |
| 5,812,819 A | 9/1998 | Rodwin et al. .............. | 395/500 |
| 5,835,725 A | 11/1998 | Chiang et al. ......... | 395/200.58 |
| 5,872,524 A | 2/1999 | Iida ........................ | 340/825.52 |
| 5,983,090 A * | 11/1999 | Aoki ........................... | 370/329 |
| 5,987,524 A * | 11/1999 | Yoshida et al. ............. | 709/238 |
| 6,014,753 A * | 1/2000 | Miyamoto et al. .......... | 709/203 |
| 6,108,701 A * | 8/2000 | Davies et al. ............... | 709/203 |
| 6,212,556 B1 * | 4/2001 | Arunachalam ............... | 709/219 |
| 6,393,488 B1 * | 5/2002 | Araujo ........................ | 709/227 |

* cited by examiner

*Primary Examiner*—Zarni Maung
*Assistant Examiner*—Wen-Tai Lin
(74) *Attorney, Agent, or Firm*—Chernoff, Vilhauer, McClung & Stenzel, LLP

(57) ABSTRACT

A system obtains a second address, such as a unique IP address, from a called device by a calling device across a computer network. A first address and nick related to the called device is registered with a third device interconnected with the computer network, such as a gatekeeper, where the first address is associate with multiple devices, such as a sub-network broadcast address. The second device requests the first address from the third device by using the nick, and then initiates a first transfer of data, such as a call setup, from the second device to the first device using said first address. The first device receives the first transfer of data and in response requests a second address free from associate with said multiple devices from a fourth device, such as an address server. The first devices receives the second address from the fourth device and in response provides the second address to the second device.

56 Claims, 6 Drawing Sheets

METHOD FOR OBTAINING A SECOND ADDRESS FREE FROM ASSOCIATION WITH MULTIPLE DEVICES

BACKGROUND OF THE INVENTION

The present invention relates to a system for obtaining computer addresses.

A computer network is a geographically distributed collection of communication links and sub-networks interconnected by intermediate stations, such as routers, for transporting data between end stations coupled to the network. A local area network (LAN) may be an example of such a sub-network consisting of a transmission medium, such as coaxial cable or twisted pair, that provides relatively short distance communication among the interconnected stations. Communication links, on the other hand, may take the form of wide area networks (WANs), such as public or private telecommunications facilities, and dial-up lines of a switched telephone network that connect stations to the network via modems. The stations typically communicate by exchanging discrete packets or frames of data according to predefined protocols. In this context, a protocol consists of a set of rules defining how the stations interact with each other.

Most networks are typically organized as a series of hardware and software levels or "layers" within each station. These layers interact to format data for transfer between, e.g., a source station and a destination station communicating over the network. Specifically, predetermined services are performed on the data as it passes through each layer and the layers communicate with each other by predefined protocols. This layered design permits each layer to offer selected services to its higher layers for the details of actual implementation of the services.

Modern communication architectures are organized as such layered designs. Whereas the lower layers of these architectures are generally standardized and, typically implemented in hardware and firmware, the higher layers are generally implemented in the form of software running in the stations attached to the network. Examples of such communications architectures include Novell Inc.'s NetWare architecture, Apple Computer Inc.'s AppleTalk architecture, and the Internet communications architecture.

The Internet architecture is represented by four layers which are termed, in ascending interfacing order, a network interface, an internetwork, a transport, and application layers. These layers are arranged to form a protocol stack in each communicating station of the network. FIG. 1 illustrates a schematic block diagram of existing Internet protocol stacks 125 and 127 used to transmit data between a source station 110 and a destination station 150, respectively, of a LAN environment 100. As can be seen, the stacks 125 and 175 are physically connected through a communications channel 180 at the network interface layers 120 and 160. For each of description, the protocol stack 125 will be described.

In general, the lower layers of the communications stack provide inter-networking services and the upper layers, which are the user of these services, collectively provide common network application services. The transport layer 114 serves as the boundary between the network-specific elements and the application-specific elements. The transport layer's fundamental service is to move a user's data from its source to its destination over a communication path using the internetwork subsystem. To do this effectively, the transport service operates end-to-end whether the path is over a single sub-network or across multiple interconnected sub-networks.

The application layer 112 provide services suitable for the different types of applications using the network, such as, terminal connections, electronic mail, the Simple Mail Transfer Protocol, and the File Transfer Protocol. The lower network interface layer 120 of the Internet architecture accepts industry standards, such as IEEE standard 802, which defines a flexible network architecture oriented to the implementation of LANs.

Specifically, the IEEE approach addresses LAN protocols that occupy physical and data link sub-layers of layer 120. The physical layer 126 is concerned with the actual transmission of signals across the communication channel and provides which is usually referred to as the "wire" between two nodes and a network. In this context, the physical layer defines the types of cabling, plugs, and connectors used in connection with the channel.

The data link sub-layer, on the other hand, is responsible for transmission of data from one station to another. In the IEEE 802 architecture, the data link layer is divided into two sub-layers, Logical Link Control (LLC 122) and Media Access Control (MAC 124). The LLC sublayer 122 manages communications between devices over a single link of a network to allow overlying internetwork layer access to the services of the LAN without regard to the actual network implementation. More specifically, the LLC layer provides for environments that need connectionless or connection-oriented services at the data link layer.

The MAC sub-layer 124 is primarily concerned with controlling access to the transmission medium in an orderly manner and, to that end, defines rules or procedures by which the stations must abide in order to share the medium. In order for multiple stations to share the same medium and still uniquely identify each other, the MAC sublayer defines a hardware or data link address called the MAC address. This MAC address is unique for each station interfacing to a LAN. The MAC layer further provides framing functions including the addition of head and trailer information needed to identify the boundaries of frames to synchronize communication between source and destination stations.

The functions provided at these lowest sub-levels are generally standard and most LAN implementations are in accord with one of three IEEE LAN standards. IEEE 802.3 carrier sense multiple access with collision detection (CSMA/CD), IEEE 802.4 token bus, or IEEE 802.5 token ring. For example, Ethernet is a LAN architecture that uses CSMA/CD for media access control.

The primary network layer protocol of the Internet architecture is the Internet protocol (IP) contained within the internetwork layer 116. IP is primarily a connectionless network protocol that provides internetwork routing, fragmentation, and reassembly of datagrams and that relies on transport protocols for end-to-end reliability. An example of such a transport protocol is the Transmission Control Protocol (TCP) contained within the transport layer 114. Notably, TCP provides connection-oriented services to the upper layer protocols of the Internet architecture. Although the two protocols TCP and IP are but two of the building blocks required for the complete Internet communications architecture, the term TCP/IP is commonly used to refer to this architecture.

Connection oriented services generally involve three distinct phases: connection establishment, data transfer, and connection termination. During connection establishment, a single path is found between the source and destination stations. Once the connection has been established, data is transferred sequentially over that established path and, when the connection is no longer needed, the path is terminated. As described more fully herein, the transport layer 114 and the internetwork layer 116 are substantially involved in providing predefined sets of services to aid in connecting the source station to the destination station when establishing application-to-application communication sessions.

Data transmission over the LAN 100 therefore consists of generating data in, e.g., sending process 104 executing on the source station 110, passing that data to the application layer 112 and down through the layers of the protocol stack 125, where the data are sequentially formatted as a frame for delivery onto the channel 180 as bits. Those frame bits are then transmitted over an established connection of channel 180 to the protocol stack 175 of the destination station 150 where they have passed up that stack to a receiving process 174. Data flow is schematically illustrated by solid arrows.

Although actual data transmission occurs vertically through the stacks, each layer is programmed as though such transmission were horizontal. That is, each layer in the source station 110 is programmed to transmit data to its corresponding layer in the destination station 150, as schematically shown by dotted arrows. To achieve this effect, each layer of the protocol stack 125 in the source station 110 typically adds information (in the form of a header field) to the data frame generated by the sending process as the frame descends the stack. At the destination station 150, the various encapsulated headers are stripped off one-by-one as the frame propagates up the layers of the stack 175 until it arrives at the receiving process. There are several network protocols used to interconnect LANs or other communication links, such as point-to-point, and Systems Network Architecture (SNA).

There are many protocols for transmitting voice and/or video signal transmissions, e.g. Internet Telephony, over a network. The initial signaling information, as well as the media stream itself, is packetized in packets and transferred over the network. In particular, the protocol typically employed for the Internet is IP, as previously described. All packets in the IP network are routed using IP addresses, and accordingly a calling device, or any intermediate entities that handle Internet Telephony need to have knowledge of the IP address of a called device to convey the information to the destination device. The setting up and use of such a telephony interconnection (audio and/or video) using the Internet implies two basic presumptions, namely, (1) that the IP address of the calling device and called device remains static over time, and (2) the IP address of the called device is known to the public. Otherwise, if one of the IP addresses changes before a call is connected or during a call, then the data will not reach the intended destination device.

In a manner similar to a telephone book, a device may register their "nick" (alias address, user ID) and current IP address with a "gatekeeper" so that others may obtain their IP address by referring to that "nick". The "nick" may be any type of identification of a particular device or user. In essence, the "gatekeeper" includes the relationship between the "nick" of a user and their current IP address. One implementation of a gatekeeper is defined in the ITU-T H.323 specification, incorporated by reference herein. The H.323 protocol includes a gatekeeper discovery process for an endpoint (device on the network) to determine which gatekeeper to register with. This may be done manually or automatically. After determining which gatekeeper to register with the endpoint joins a "zone", and informs the gatekeeper of its IP address and nick.

There are a limited number of IP addresses available to network devices, including devices on a LAN or devices connected through point-to-point connections, such as a personal computer or a workstation. If there are a large number of devices on a particular network then there may be more devices than unique available IP addresses. To maximize the availability of IP addresses, they are typically dynamically assigned to each network device when the network device is in use. Accordingly, during different sessions the IP address for a particular device may change. Unfortunately, any calling device will not be informed of the different IP address so the called device needs to register again with the gatekeeper to provide its current IP address.

Referring to FIG. 2, a network structure 200 may include endpoint A 202 connected to the IP network 204 through a LAN 206 and a router 208. Endpoint B 210 is a remote device connected directly to the IP network 204. The gatekeeper 212 is connected to the IP network 204 to manage the community of users, in term of address resolution (nick to IP address), authentication, billing, etc. The LAN 206 which has access to the IP network 204 through the router 208, normally includes at least one address server 214. The address server 214 of the LAN 206 dynamically assigns IP addresses, typically based upon usage, to devices on the LAN 206 to permit sharing of a limited number of IP addresses available. In this manner, the devices connected to the LAN 206 do not each require a permanent unique IP address, which may not be available if there are a large potential number of users on the LAN 206. The limitation of temporary and unknown IP addresses for the Internet Telephony exists in this environment.

One potential solution to the limitation of using a temporary IP address, especially for Internet telephony, is for the device to request to the address server an unlimited duration for the current IP address. Typically address servers are not designed to provide unlimited duration IP addresses so such a request is either ignored, or such a request for an unlimited IP address is not guaranteed. In addition, the address server may not have sufficient available addresses to supply the demand for such requests.

Another potential solution to the limitation of using a temporary IP address is for the device to request an extension of the IP address prior to it being terminated. While many address servers will accommodate such a request, it is not guaranteed by the address server.

What is desired, therefore, is a system that permits the effective termination of packet-based communications in an environment where the network ad dress is dynamically and temporarily assigned.

SUMMARY OF THE INVENTION

The pre set invention overcomes the aforementioned drawbacks of the prior art in a first embodiment by providing a system that obtains a second address, such as a unique IP address, from a called device by a calling device across a computer network. A first address and nick related to the called device is registered with a third device interconnected with the computer network, such as a gatekeeper, where the first address is associate with multiple devices, such as a sub-network broadcast address. The second device requests the first address from the third device by using the nick, and then initiates a first transfer of data, such as a call setup, from the second device to the first device using said first address. The first device receives the first transfer of data and in response requests a second address free from associate with said multiple devices from a fourth device, such as an address server. The first devices receives the second address from the fourth device and in response provides the second address to the second device. In this manner, the temporary dynamic allocation of address is alleviated by using an address registered with the gatekeeper that remains constant over time.

In another embodiment a fifth device, such as a call agent, is employed whose address is registered with the third device, e.g. gatekeeper. In addition, the first data transfer is directed to the third device, which in response passes the data transfer to the appropriate device, such as the first device. The first device then obtains a unique address and provides that address to the second device. In this manner, in environments that do not permit sub-network broadcasts the advantages of the present invention are still realized.

DETAILED DESCRIPTION OF THE PREFERRED EMBODIMENT

Figure 1:
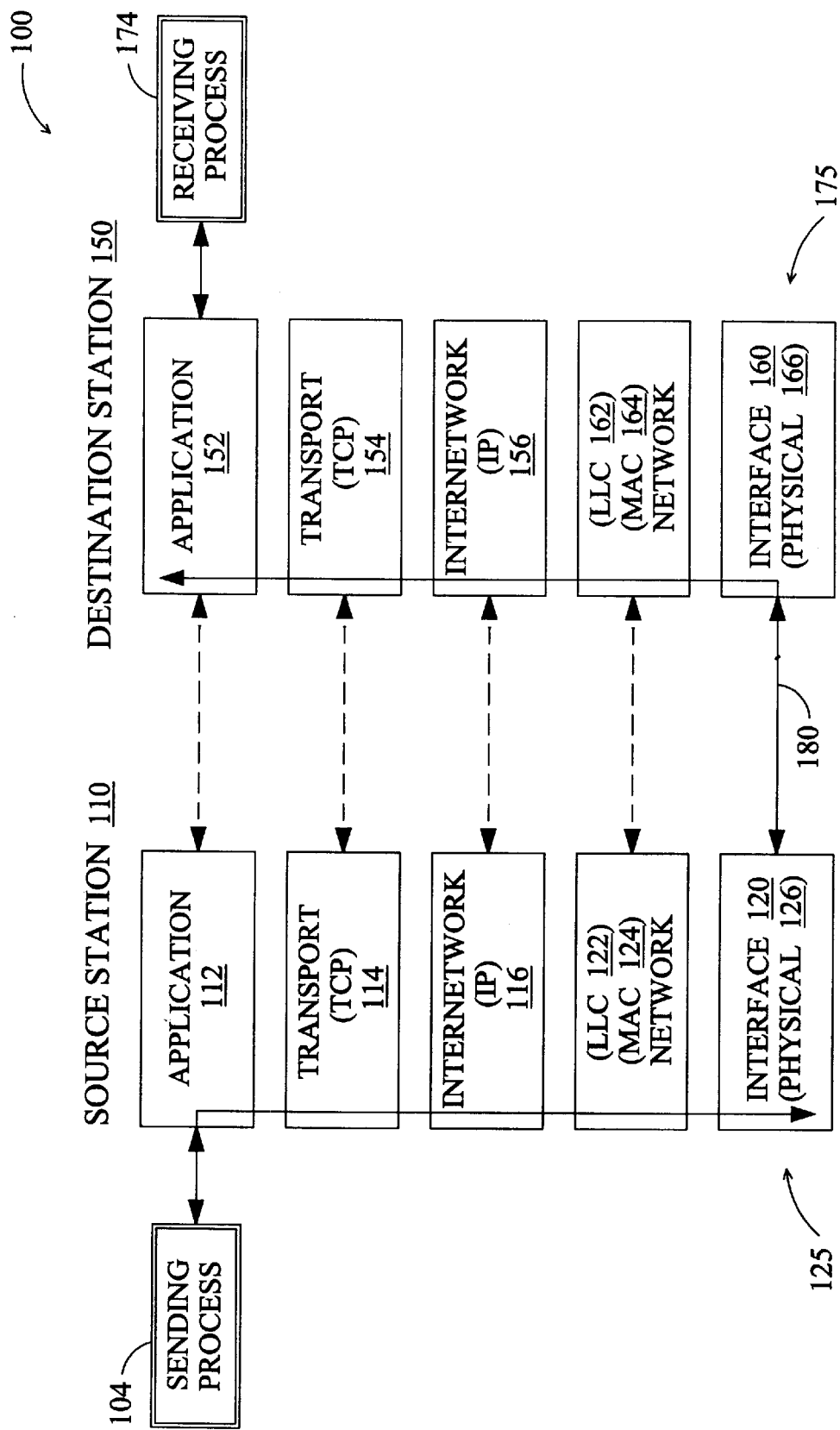
FIG. 1 is an illustration of existing Internet protocol stacks.
Figure 2:
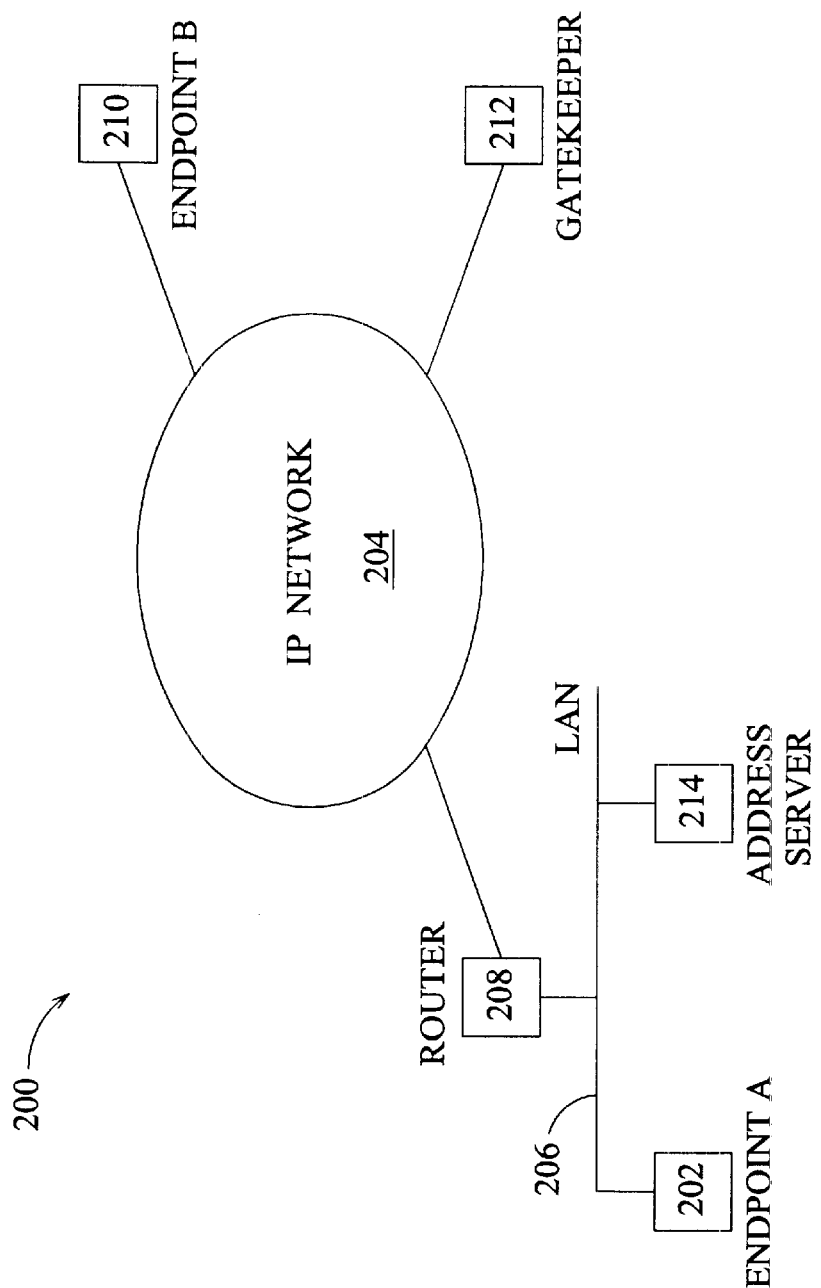
FIG. 2 is an illustration of a computer network including an address server and gatekeeper.
Figure 3:
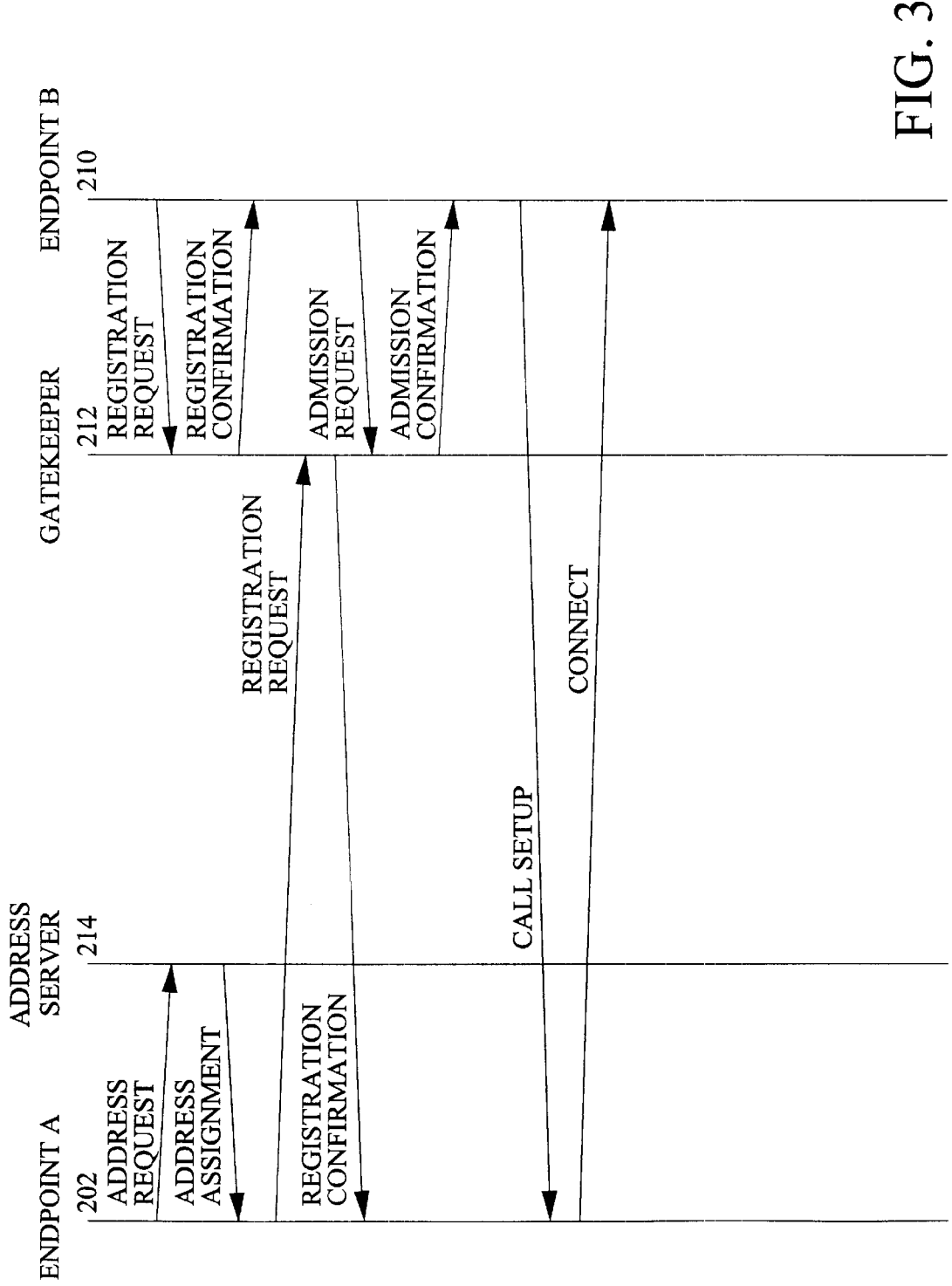
FIG. 3 is an illustration of interconnecting two device using traditional techniques.

To develop a suitable solution to the temporary IP address limitations imposed by the existing system, the present inventor further considered the particulars of the H.323 protocol. Referring to FIG. 3, the message flow among the different components of a network using the H.323 protocol is illustrated. Endpoint A 202 requests the IP address-assignment, typically using the Dynamic Host Configuration Protocol (DHCP), from the address server 214. The address server 214 provides a response that includes a temporary IP address. The assigned IP address is temporary for the particular device and recycled for other devices, unless the devices requests to extend the use of the temporary IP address. Endpoint A 202 or endpoint B 210 sends the gatekeeper 212 the registration request that contains its IP addresses and nick. The nick, which identifies the user joining in the community, may be any suitable type such as an ITU-T E.164 address, an e-mail address, a nickname, etc. The gatekeeper 212 provides a registration confirmation to the registry device. Endpoint B 210, the calling device, now initiates a call by sending the gatekeeper 212 an admission request with the nick of endpoint A 202, the called device. The gatekeeper 212 responds by sending an admission confirmation with the IP address of endpoint A 202. Endpoint B 210 then sends a call setup message with the nick to endpoint A 202, that is packetized in an IP packet whose destination address is the one of endpoint A 202 provided by the gatekeeper 212. As previously mentioned, the IP address of endpoint A 202 may no longer be valid, resulting in the call by endpoint B 212 to fail.

Figure 4:
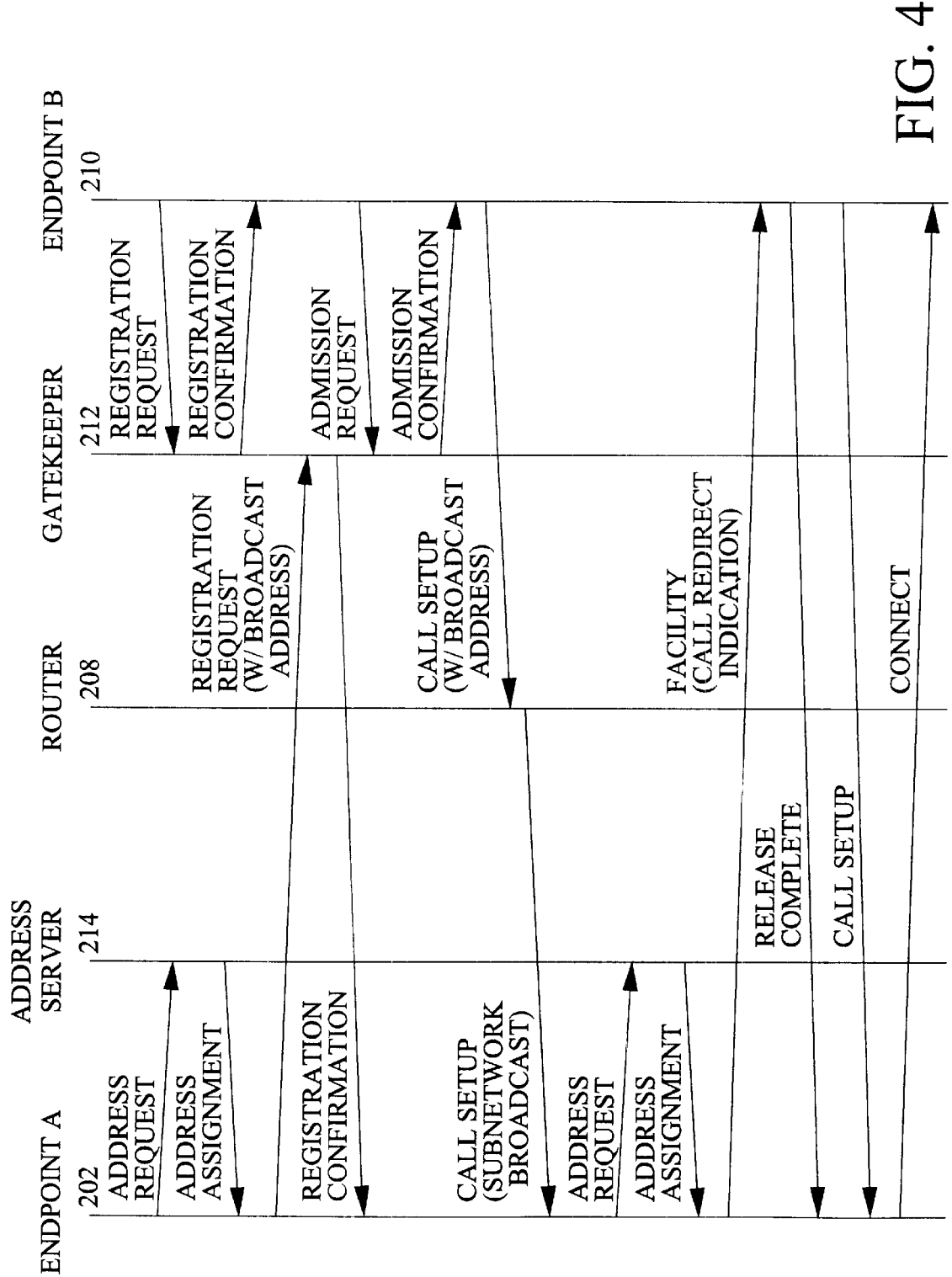
FIG. 4 is an exemplary embodiment of interconnecting two devices in accordance with the one aspect of the present invention.

The present inventor considered the structure of the network 200 and came to the realization that most LANs 206 include a broadcast IP address that is common to all (or a plurality of) devices on the LAN 206 which may be utilized in a specialized manner to alleviate the limitations inherent with IP addresses. Referring to FIG. 4, in an exemplary embodiment of the present invention endpoint A 202 makes an address request from the address server 214 which returns the address assignment in the form of a sub-network broadcast address. A broadcast address is an address that is in common to all (or a plurality of) devices connected to the LAN which may receive the data packet, as opposed to an individual address for a specific device. Endpoint A 202 then registers itself to the gatekeeper 212 using the sub-network broadcast IP address instead of a temporarily assigned IP address. The gatekeeper 212 then may provide registration confirmation to endpoint A 202. Endpoint B 210 preferably makes a registration request and receives a registration confirmation from the gatekeeper 212. Endpoint B 210 then makes an admission request of the gatekeeper 212 for endpoint A 202 which in turn provides the broadcast IP address of endpoint A 202 together with the nick, if desired. Endpoint B 210 then makes a call setup through the router 208 to endpoint A 202. The router 208 receives the call setup and passes the call setup packet to the address server 214 of the LAN 206 using the broadcast IP address. The address server 214 then broadcasts the packet and endpoint A 202, and other devices on the LAN 206, receives the call setup packet. Endpoint A 202 recognizes the nick as intended for itself and then receives the call setup packet. Endpoint A 202 then makes an address request to the address server 214 for an individual IP address for itself (preferably unique) and receives such an assignment from the address server 214. With a current IP address, endpoint A 202 sends a call redirection indication to endpoint B 210 indicating the proper IP address is not the broadcast IP address, but instead the actual IP address that was assigned. In response endpoint B 210 may release the first call by endpoint B 210 and then perform another call setup with the updated IP address. The call setup procedure is completed and the connection is obtained.

By using the sub-network broadcast address together with the redirecting of the IP address of the calling device, the limitations imposed by the dynamic allocation of the IP addresses are alleviated. In addition, the traditional functionality of the network is not sacrificed, merely the destination device needs to use the sub-network broadcast address, all of which may be independent of the remainder of the network.

In a further embodiment, the redirection message may be routed through the gatekeeper, so that the gatekeeper may keep track of what is happening on endpoint A. As well, endpoint A may desire to send the gatekeeper a registration request during the call to update its registry with a current IP address.

Figure 5:
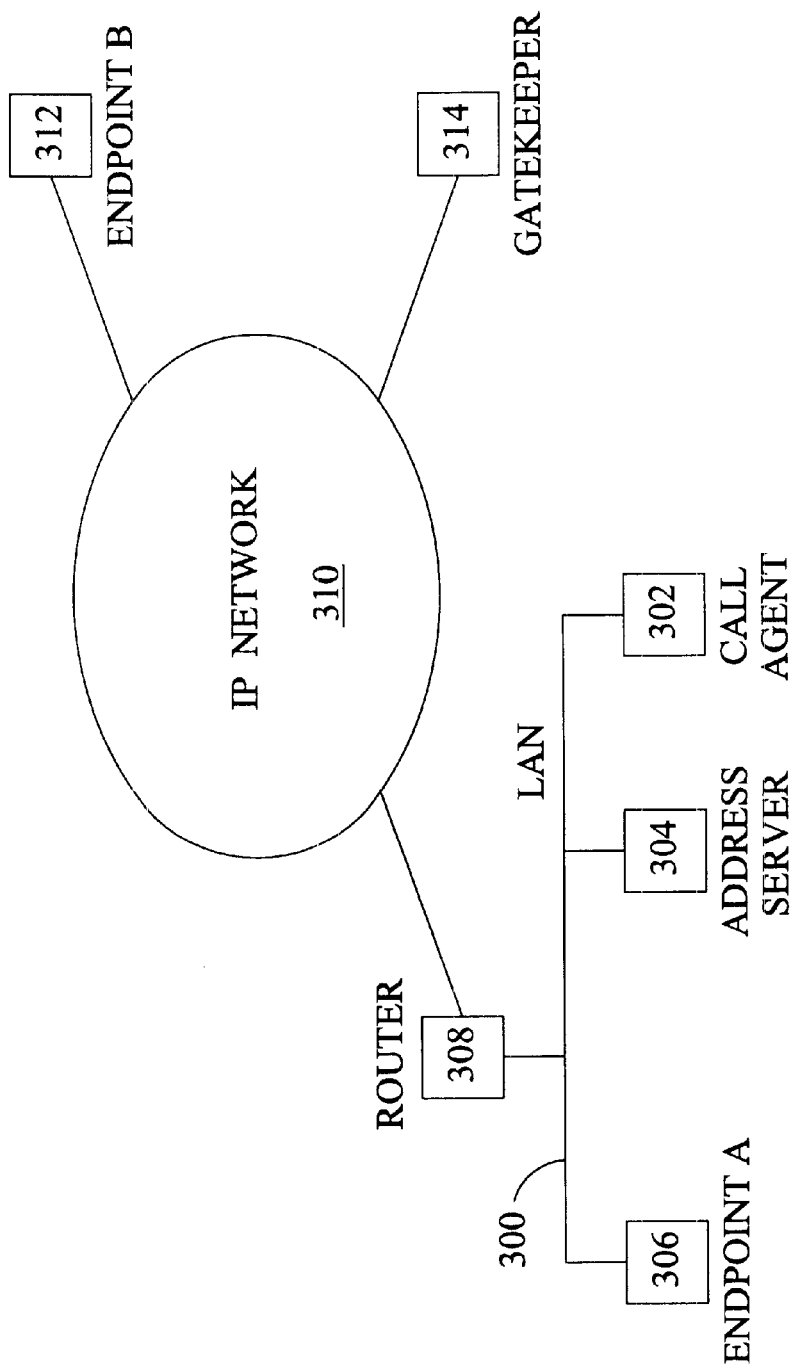
FIG. 5 is an illustration of a computer network including a call agent.

In some network environments sub-network broadcasting is not allowed from a remote network due to security concerns. Referring to FIG. 5, an alternative embodiment includes a LAN 300 which connects to a call agent 302 with a fixed IP address. The call agent 302 is responsible for handling call signaling messages for any device attacked to the LAN 300 whose IP address is not being assigned.

Figure 6:
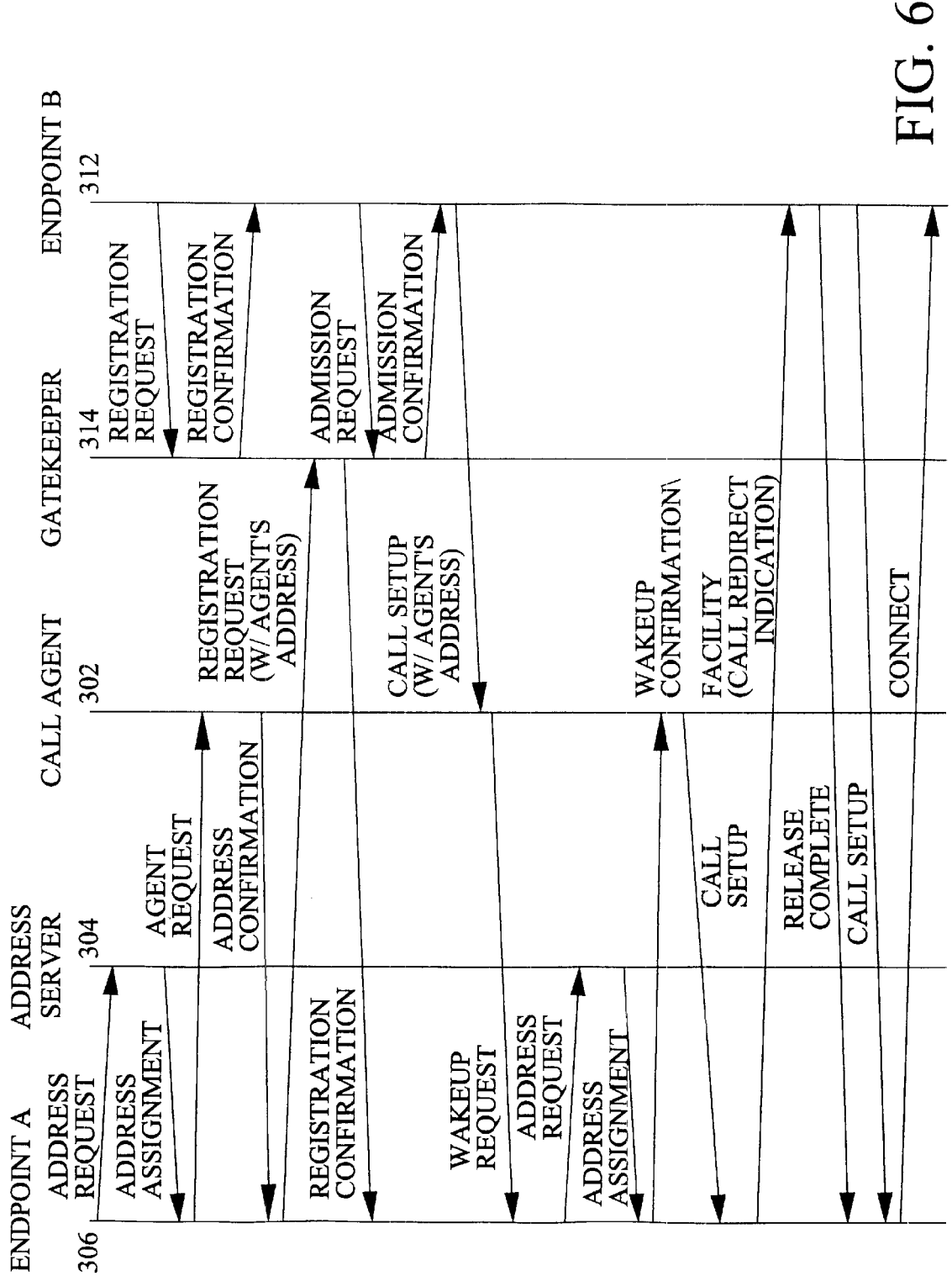
FIG. 6 is an exemplary embodiment of interconnecting two devices in accordance with another aspect of the present invention.

Referring also to FIG. 6, endpoint A 306 sends the call agent 302 a registration request. The registration request to the call agent 302 contains endpoint A's 306 nick and hardware address, such as for example, its Ethernet address. The Ethernet address of a device is a permanent assigned address within the network. The call agent 302 stores the nick and hardware address of endpoint A 306 and responds with the agent confirmation which includes the call agent's 302 IP address. Then endpoint A 306 registers to the gatekeeper 314 its nick and the IP address of the call agent 302. At this point an address associated with the LAN 300 is registered with the gatekeeper 314.

Endpoint B 312 then initiates a call to endpoint A by following the procedure described with respect to FIG. 5. The call setup is delivered to the call agent 302. The call agent 302 queries the nick in the call setup message to determine the hardware address of the called device in its storage. The call agent 302 then sends a wakeup request to endpoint A 306 using the hardware address associated with the nick. Upon receipt of the wakeup request, endpoint A 306 performs the address assignment request procedure followed by sending the Wakeup Confirmation with the assigned IP address to the call agent 302. The call agent 302 then sends endpoint A 306 the call setup message. The remaining procedure is the same as outlined with respect to FIG. 5. In essence, the use of the call agent 302 performs the function of a permanent assigned IP address that is not subject to the temporary assignment of IP addresses.

It is to be understood that the network may be constructed in any suitable manner. For example, a router may be omitted, if desired. Endpoint A and/or Endpoint B may be directly connected to the network or connected through a LAN or router. In addition, the gatekeeper may be accessible to the network through a LAN, such as LAN 300. Also, the endpoints, address server, call agent, router, gatekeeper, and computer network, may be separate processes, generally referred to herein as devices, operating on the same or different computers, if desired.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method of obtaining a second address of a first device by a second device across a computer network comprising the steps of:
   (a) registering a first address and a nick related to said first device with a third device interconnected with said computer network where said first address is associated with multiple devices;
   (b) requesting said first address from said third device by said second device using said nick;
   (c) initiating a first transfer of data from said second device to said first device using said first address;
   (d) receiving said first transfer of data by said first device and in response requesting a second address free from association with said multiple devices from a fourth device; and
   (e) said first device receiving said second address from said fourth device and in response providing said second address to said second device.

2. The method of claim 1 further comprising the step of said second device initiating a second transfer of data from said second device to said first device using said second address.

3. The method of claim 2 wherein said-first transfer of data is a call setup.

4. The method of claim 3 wherein said first address is a broadcast address.

5. The method of claim 1 wherein said first address is an IP broadcast address of a network.

6. The method of claim 5 wherein said third device is an address server.

7. The method of claim 1 wherein said computer network includes the use of a TCP/IP protocol.

8. The method of claim 1 wherein said first address is a broadcast address.

9. The method of claim 8 wherein said first data transfer is received by a plurality of said multiple devices.

10. The method of claim 9 where in said multiple devices are each interconnected within a LAN and interconnected to said computer network by a router.

11. The method of claim 1 wherein said nick is at least one of a user ID and alias.

12. The method of claim 1 wherein said third device is a gatekeeper.

13. The method of claim 10 wherein said fourth device is an address server.

14. The method of claim 2 wherein said second transfer of data is a call setup.

15. The method of claim 14 wherein said second address is an IP address of said second device.

16. The method of claim 14 further comprising the step of transmitting a third transfer of data from said first device to said second device of a release complete.

17. The method of claim 14 further comprising the step of transmitting a release complete from said second device to said first device prior to said second transfer of data.

18. The method of claim 1 further comprising said first device requesting said first address from said fourth device.

19. The method of claim 18 further comprising said first device registering said first address and said nick with said third device.

20. The method of claim 19 further comprising said first device receiving a registration confirmation from said third device in response to said registering.

21. The method of claim 20 further comprising said second device initiating a second transfer of data from said second device to said first device using said second address.

22. The method of claim 21 wherein said second transfer is a release complete.

23. The method of claim 22 further comprising said second device initiating a third transfer of data from said second device to said first device using said second address for a call setup.

24. The method of claim 23 further comprising said first device initiating a fourth transfer of data from said first device to said second device of at least one of audio and video data.

25. The method of claim 24 wherein at least one of said first and second address is an IP address.

26. The method of claim 25 wherein said computer network includes the use of TCP/IP protocols.

27. The method of claim 26 wherein said multiple devices are connected to a local area network.

28. The method of claim 27 wherein said second device is connected to said local area network through a router.

29. A method of obtaining a second address of a first device by a second device across a computer network comprising the steps of:
   (a) registering a first address and a nick related to said first device with a third device interconnected with said computer network;
   (b) requesting said first address from said third device by said second device using said nick;
   (c) initiating a first transfer of data from said second device to a fifth device using said first address;
   (d) receiving said first transfer of data by said fifth device and in response notifying said first device of said first transfer of data;

(e) requesting a second address from a fourth device unique to said first device; and (f) at least one of said first device and said fifth device receiving said second address from said fourth device and in response providing said second address to said second device.

30. The method of claim 29 further comprising the step of said second device initiating a second transfer of data from said second device to said first device using said second address.

31. The method of claim 30 wherein said first transfer of data is a call setup.

32. The method of claim 31 wherein said first address is a broadcast address.

33. The method of claim 29 wherein said first address is an IP address of a call agent.

34. The method of claim 33 wherein said third device is an address server.

35. The method of claim 29 wherein said computer network includes the use of a TCP/IP protocol.

36. The method of claim 29 wherein said first address is a an address unique to said fifth device.

37. The method of claim 36 wherein said first data transfer is received by only said fifth device.

38. The method of claim 37 where in said fifth device, first device, and said third device are each interconnected within a LAN and interconnected to said computer network by a router.

39. The method of claim 29 wherein said nick is at least one of a user ID and alias.

40. The method of claim 29 wherein said third device is a gatekeeper.

41. The method of claim 38 wherein said fourth device is an address server.

42. The method of claim 30 wherein said second transfer of data is a call setup.

43. The method of claim 42 wherein said second address is an IP address unique to said second device.

44. The method of claim 42 further comprising the step of transmitting a third transfer of data from said first device to said second device of a release complete.

45. The method of claim 42 further comprising the step of transmitting a release complete from said second device to said first device prior to said second transfer of data.

46. The method of claim 29 further comprising said first device requesting said 10 first address from said fourth device.

47. The method of claim 46 further comprising said first device registering said first address and said nick with said third device.

48. The method of claim 47 further comprising said first device receiving a registration confirmation from said third device in response to said registering.

49. The method of claim 48 further comprising said second device initiating a second transfer of data from said second device to said first device using said second address.

50. The method of claim 49 wherein said second transfer is a release complete.

51. The method of claim 50 further comprising said second device initiating a third transfer of data from said second device to said first device using said second address for a call setup.

52. The method of claim 51 further comprising said first device initiating a fourth transfer of data from said first device to said second device of at least one of audio and video data.

53. The method of claim 52 wherein at least one of said first and second address is an IP address.

54. The method of claim 53 wherein said computer network includes the use of TCP/IP protocols.

55. The method of claim 54 wherein said first device, said fourth device, and said fifth device are connected to a LAN.

56. The method of claim 55 wherein said second device is connected to said LAN through a router.

* * * * *

UNITED STATES PATENT AND TRADEMARK OFFICE
CERTIFICATE OF CORRECTION

PATENT NO.       : 6,542,935 B1
APPLICATION NO.  : 09/363069
DATED            : April 1, 2003
INVENTOR(S)      : Art Ishii It is certified that error appears in the above-identified patent and that said Letters Patent is hereby corrected as shown below:

<u>On the title page item (57), Abstract, line 6</u>
Change "is associate with" to --is associated with--.

<u>On the title page item (57), Abstract, line 12</u>
Change "from associate with" to --from association with--.

<u>Col. 1, line 57</u>
Change "each of description" to --each description--.

<u>Col. 2, line 4</u>
Change "provide" to --provides--.

<u>Col. 2, line 9</u>
Change "802" to --802--.

<u>Col. 2, line 16</u>
Change "provides which is usually" to --provides what is usually--.

<u>Col. 3, line 14</u>
Change "data are sequentially" to --data is sequentially--.

<u>Col. 4, line 19</u>
Change "in term of" to --in terms of--.

<u>Col. 4, line 49</u>
Change "ad dress" to --address--.

<u>Col. 4, line 53</u>
Change "pre set" to --present--.

<u>Col. 4, line 60</u>
Change "is associate with" to --is associated with--.

<u>Col. 4, line 66</u>
Change "associate" to --association--.

<u>Col. 5, line 23</u>
Change "two device" to --two devices--.

UNITED STATES PATENT AND TRADEMARK OFFICE
CERTIFICATE OF CORRECTION

PATENT NO. : 6,542,935 B1
APPLICATION NO. : 09/363069
DATED : April 1, 2003
INVENTOR(S) : Art Ishii It is certified that error appears in the above-identified patent and that said Letters Patent is hereby corrected as shown below:

Col. 5, lines 42-43
Change "address-assignment" to --address assignment--.

Col. 5, line 48
Change "devices requests" to --device requests--.

Col. 6, line 59
Change "attacked to" to --attached to--.

Col. 7, line 62
Change "said-first" to --said first--.

Col. 9, line 22
Change "is a an" to --is an--.

Col. 10, line 8
Change "said 10 first" to --said first--.

Signed and Sealed this

Seventeenth Day of June, 2008

JON W. DUDAS
*Director of the United States Patent and Trademark Office*